(12) United States Patent
Herkner

(10) Patent No.: US 9,259,864 B2
(45) Date of Patent: Feb. 16, 2016

(54) METHOD AND MOLD FOR THE PRODUCTION OF PARTS FROM FIBER-REINFORCED COMPOSITE MATERIAL BY MEANS OF MICROWAVES

(75) Inventor: Thomas Mathias Herkner, Munich (DE)

(73) Assignee: GKN Aerospace Services Limited, East Cowes, Isle of Wight (GB)

( * ) Notice: Subject to any disclaimer, the term of this patent is extended or adjusted under 35 U.S.C. 154(b) by 648 days.

(21) Appl. No.: 12/999,738

(22) PCT Filed: Jun. 16, 2009

(86) PCT No.: PCT/EP2009/057470
§ 371 (c)(1),
(2), (4) Date: Mar. 10, 2011

(87) PCT Pub. No.: WO2009/153259
PCT Pub. Date: Dec. 23, 2009

(65) Prior Publication Data
US 2011/0163480 A1 Jul. 7, 2011

(30) Foreign Application Priority Data
Jun. 18, 2008 (DE) .......................... 10 2008 029 058

(51) Int. Cl.
*B29C 67/00* (2006.01)
*B28B 21/42* (2006.01)
(Continued)

(52) U.S. Cl.
CPC ............ *B29C 35/0805* (2013.01); *B29C 33/06* (2013.01); *B29C 33/08* (2013.01);
(Continued)

(58) Field of Classification Search
CPC .................................. B29C 33/06; B29C 33/08
USPC .................................................... 264/402, 489
See application file for complete search history.

(56) References Cited

U.S. PATENT DOCUMENTS 5,489,664 A * 2/1996 Parodi .................... C07C 255/13
522/166
5,866,060 A 2/1999 Buckley
(Continued)

FOREIGN PATENT DOCUMENTS

DE 10360743 A1 7/2005
DE 102005050528 A1 4/2007
(Continued)

OTHER PUBLICATIONS

Machine translation of JP 2002-079587.*
(Continued)

*Primary Examiner* — Alison Hindenlang
*Assistant Examiner* — Robert J Grun
(74) *Attorney, Agent, or Firm* — Bejin Bieneman PLC

(57) ABSTRACT

Disclosed herein is a method for producing a part comprising at least one layer of fiber-reinforced composite material. Said method encompasses at least the following steps: a) the at least one layer of polymerizable fiber-reinforced composite material is arranged in a shape that has a base and a plurality of elevations; b) at least one mold is placed so as to be in contact with at least one elevation, said mold having a microwave-sensitive material at least on one contact surface towards the at least one elevation; c) the at least one elevation is polymerized by irradiating the at least one mold with microwaves. The mold used has a stable three-dimensional shape and has a contact surface for the part. At least the contact surface is made of microwave-sensitive material.

13 Claims, 2 Drawing Sheets

(51) Int. Cl.
B29C 35/08 (2006.01)
B29C 33/06 (2006.01)
B29C 33/08 (2006.01)
B29C 35/02 (2006.01)
B29C 70/88 (2006.01)
B29L 31/30 (2006.01)

(52) U.S. Cl.
CPC ............ B29C35/0266 (2013.01); B29C 70/88 (2013.01); *B29C 2035/0855* (2013.01); *B29L 2031/3076* (2013.01); *Y02T 50/433* (2013.01)

(56) References Cited

U.S. PATENT DOCUMENTS

| | | | | |
|---|---|---|---|---|
| 6,984,352 | B1* | 1/2006 | Akopyan | B29C 33/3828 264/219 |
| 2004/0012118 | A1* | 1/2004 | Perez et al. | 264/257 |
| 2005/0183816 | A1 | 8/2005 | Ilzhoefer et al. | |
| 2007/0254060 | A1* | 11/2007 | Errington et al. | 425/445 |
| 2009/0324765 | A1* | 12/2009 | Lengsfeld et al. | 425/174.2 |
| 2011/0031433 | A1* | 2/2011 | Burchell | 252/62.56 |

FOREIGN PATENT DOCUMENTS

| | | |
|---|---|---|
| JP | 02006107 A | 1/1990 |
| JP | 2002079587 A | 3/2002 |
| WO | WO-9959802 A1 | 11/1999 |
| WO | WO-2008007043 A1 | 1/2008 |

OTHER PUBLICATIONS

PCT International Search Report PCT/EP2009/057470 dated Apr. 16, 2010.

German Search Report for corresponding German patent application—"Recherchebericht", 4 pages, mailed Jan. 14, 2013; provided for X, Y, or A designations on p. 2, thereby satisfying requirement of concise explanation of relevance of cited documents.

Japanese Patent Office, English Translation of Notification of Reasons for Rejection, Application No. 2011-514021, Dec. 10, 2013, 3 pages.

* cited by examiner

METHOD AND MOLD FOR THE PRODUCTION OF PARTS FROM FIBER-REINFORCED COMPOSITE MATERIAL BY MEANS OF MICROWAVES

CROSS-REFERENCE TO RELATED APPLICATIONS

This application is a National Phase of International Application No. PCT/EP2009/057470, filed on Jun. 16, 2009, which claims priority to German Application No. 10 2008 029 058.0 filed on Jun. 18, 2008, which applications are hereby incorporated by reference in there entirety.

TECHNICAL FIELD

The present disclosure relates to a method for producing a structural part having at least one layer comprising fiber-reinforced composite material and to a tool for such a method. The disclosed method and tool may be used for the production of components of a fuselage and/or of a larger flow surface of an airplane.

BACKGROUND

With respect to the efforts which are being made to provide airplanes which conform to future ecological requirements and are inexpensive to produce and operate, and to nevertheless meet the strictest safety requirements, possible ways are increasingly being sought to produce the essential primary structures (e.g. wings, fuselage components, housing for the drive units, etc.) using fiber-reinforced composite material rather than aluminum. This lightweight construction technique makes it possible, in particular, to considerably reduce the weight of the airplanes. During the production of such essential primary structures, it must be taken into account that these take on a considerable scale; by way of example, the landing flaps are structural parts which extend over a number of meters. These structural parts are additionally exposed to high levels of stress during operation and therefore represent safety-critical structural parts, for which special quality requirements have to be observed.

Fiber-reinforced composite materials of this type generally comprise two essential components, namely firstly the fibers and secondly a polymer matrix which surrounds the fibers. The matrix encompasses the fibers and is cured by a thermal treatment (polymerization), such that three-dimensional cross-linking takes place. This polymerization has the effect that the fibers are bonded firmly to one another and therefore forces can be introduced into the fibers, namely predominantly via shear stresses. Suitable fibers are both carbon fibers and possibly also glass fibers. Carbon fibers, which nowadays are still relatively expensive, regularly comprise carbon to an extent of at least 90% by weight. The diameter of the fibers is, for example, 4.5 to 8 $\mu m$ (micrometer). Carbon fibers of this type have anisotropic properties. By contrast, glass fibers have an amorphous structure and isotropic properties. They predominantly consist of silicon oxide, it being possible for further oxides to be admixed if appropriate. Whereas the glass fibers are relatively inexpensive, the carbon fibers are noted for their high strength and rigidity.

Particularly in the construction of airplanes, what is known as pre-preg technology is employed. In this technology, for example, pre-impregnated fabrics or other fiber forms (preform) are soaked in synthetic resins and thermally treated merely until they solidify slightly (gel formation), such that they can be handled in layers. A pre-preg material of this type exhibits a small degree of adhesion and can therefore be arranged readily in appropriate molding tools or one on top of another in layers, until the desired form of the structural part is formed. When the desired layers of the pre-preg material are arranged, they can be (thermally) cured. In order to cure said pre-preg structural parts, use is presently made of what are known as autoclaves, i.e. ovens which may have to be heated with an overpressure (up to 10 bar) over many hours in order to achieve complete curing of the structural parts.

In addition, DE 10 2005 050 528 A1, the contents of which are incorporated by reference, discloses a microwave autoclave, with which the production of fiber composite structural parts by microwave radiation is proposed. The apparatus proposed in said document makes it possible to couple microwave radiation into the pressure chamber of the autoclave. The direct excitation of the pre-preg materials suitable for this method with microwaves has the advantage that it is not necessary to heat the air located in the autoclave or the inert gas located therein, which is present in a considerable volume owing to the size of the structural parts. The use of microwave technology makes it possible to heat the pre-preg material to be cured itself directly, and the rest of the surrounding region accordingly remains relatively cold.

The microwave resonator described in DE 103 29 411 A1, the contents of which are incorporated by reference, is likewise suitable for carrying out the thermal treatment. Said microwave resonator is generally operated without an overpressure. However, it may also be integrated in a pressure vessel (autoclave).

When heating a material using microwaves, the following active mechanisms may set in: dielectric heating and resistive heating. If (freely) movable dipoles (i.e. molecules having an irregular charge distribution) are present in the material, these are excited to oscillate at a high frequency in an electromagnetic field produced by the microwaves. This kinetic energy of the dipoles is then converted by internal friction into heat, which is produced directly in the material (dielectric heating). In addition, it is also possible for eddy currents to arise as a result of induction, and therefore the electrical resistance of the material finally causes an increase in temperature (resistive heating). By way of example, the material can thus be heated to temperatures above 130° C., above 160° C. or even also above 200° C. This temperature level makes it possible for the polymerization or curing of the pre-preg materials to set in.

In this respect, airplane components having a relatively large base surface and elevations protruding therefrom are in the foreground in particular. By way of example, said elevations are web-like fins intended to contribute, in particular, to an increase in the rigidity of the (assembled) component. Merely by way of example, elevations of this type may have a length of about 11 m (meter), a material thickness in the range of approximately 2.5 mm to 4 mm (millimeter) and a height, with which they protrude beyond the base surface, of at least 25 mm (millimeter).

During the production of such components by curing by microwave irradiation, it is important that uniform and sufficient crosslinking is ensured in materials. For this purpose, it is essential that this "contorted" shape of the component can be treated appropriately with microradiation and/or that a homogeneous temperature distribution is achieved on the component. It must also be taken into consideration that the pre-preg materials used here are regularly themselves not dimensionally stable, i.e. have to be fixed in the desired position using appropriate holding and/or molding tools during the microwave irradiation. The problem indicated above is thereby enlarged further.

SUMMARY

A method is proposed herein with which it is possible to produce the structural parts described above simply and reliably with a desirably high, uniform degree of crosslinking of the fiber-reinforced composite material. In addition, a molding tool is proposed which, in particular, ensures the uniform curing process in the course of the microwave treatment.

More specifically, a method having the features of patent claim 1 and a molding tool having the features of patent claim 5 is proposed. Further embodiment variants and fields of use of the disclosed method and molding tool are indicated in the respective dependent patent claims. It should be noted that the features indicated individually in the patent claims can be combined with one another as desired in a technologically meaningful manner and demonstrate further embodiments of the disclosure. The description, in particular in conjunction with the figures, cites further particularly preferred exemplary embodiments of the disclosure.

An exemplary method for producing a structural part having at least one layer comprising fiber-reinforced composite material comprises at least the following steps:

a) Arranging the at least one layer made of polymerizable fiber-reinforced composite material in a predetermined shape, wherein the shape has a base surface and a plurality of elevations;

b) Positioning at least one molding tool so as to be in contact with at least one elevation, wherein the molding tool is found with a microwave-sensitive material at least in one contact surface toward the at least one elevation;

c) Polymerizing the at least one elevation by irradiating the at least one molding tool with microwaves.

The fiber-reinforced composite materials used here are polymerizable. Even if it is not a primary requirement here, the fiber-reinforced composite materials can also absorb microwaves. In particular, this means that the fiber-reinforced composite material used can be heated and therefore (partial) curing (or polymerization) of the composite material, as also described in the introduction, can take place.

The fiber-reinforced composite material is, in particular, a carbon-fiber-reinforced composite material. The carbon fibers are preferably in the form of long fibers which are endless in the initial state and are arranged in the structural parts in layers, with a different orientation of the longitudinal direction of the fibers. One of the following, in particular, is suitable as resin: epoxy resin, phenolic resin, bismaleimide resin or polyester resin. In addition, it is also possible to use glass-fiber-reinforced composite materials with the known resin matrix materials.

In order to produce the structural part, it is possible for only one layer of polymerizable fiber-reinforced composite material to be used; however, it is also possible to position a plurality of such layers one on top of another at least in certain regions, in order to be able to generate, if appropriate, variable thicknesses of the structural part. The different layers can also be used to represent a more complex shape, such as here with a base surface and elevations. Here, a "layer" represents in particular a ply of a pre-preg material.

In the course of step a), by way of example, a plurality of layers are positioned one on top of another and/or next to one another on a support, such that they form the base surface. In this case, the base surface can have a size measuring several square meters and can have a (slightly) curved form. In one exemplary arrangement, on one side, specifically located opposite the support, layers are arranged in such a manner that a plurality of elevations are formed. In one exemplary arrangement, the elevations have an elongate design in the manner of fins. One exemplary configuration forms at least three, and may have at least five or even at least ten such elevations on said base surface with the layers. In particular, the desired shape of a component of a landing flap or of another flow surface of an airplane is thereby constructed.

According to step b), at least one molding tool is further positioned so as to be in contact with at least one elevation. In this case, the molding tool bears with its contact surface directly or indirectly (if appropriate via customary films, etc.) against at least one of the elevations (on one side and/or on two sides). The molding tool is formed with a microwave-sensitive material at least in the region comprising the contact surface. In particular, this means that said material is heated when it is treated or irradiated with microwaves, the effects of dielectric heating and/or resistive heating arising in particular. In this way, the molding tool is therefore (if appropriate partially) heated by the microwave irradiation, said heat then being transferred to the layers of polymerizable fiber-reinforced composite material. In this context, use is preferably made of a material which itself is not polymerizable, i.e. retains its properties in terms of dimensional stability, porosity and heat production capacity, etc. at least over a multiplicity of such microwave treatments. By way of example, the following materials (individually or in part in combination with one another) can be used for this purpose: microwave-transparent materials filled with diverse additives in different admixture ratios such as, for example, silicone, PTFE, PP, EP, PET, glass ceramic, aluminum oxide, quartz glass or the like. Additives may be: (ground) carbon short-fibers (e.g. length 0.1 to 0.25 mm), carbon black, activated carbon, nanostructures such as, for example, CNT (carbon nanotubes), silicates, sol-gel materials, etc. Further materials are (if appropriate in turn filled) rubbers and fiber composite materials with at least one polymer or thermoplastic matrix material.

Once such a molding tool has been positioned appropriately on the base surface and so as to be in contact with at least one elevation, step c) can be initiated. In this step, the entire arrangement of the polymerizable fiber-reinforced composite material layers and the molding tool is treated with microwaves, such that all of these elements are exposed to a high-frequency electromagnetic field. Since the molding tool at least partially prevents the microwaves from acting directly on the layers of polymerizable reinforced composite material, it is therefore not the layer which is treated directly with microwaves but instead (only) the molding tool. The polymerization in the layers or, in particular, in the contacted elevation and in the transition region between the elevation and the base surface is brought about uniformly via the abutment of the molding tool, which is heated owing to the microwave irradiation. It is therefore also possible to achieve a uniform and sufficient introduction of heat into the layers at these complex layer transitions, such that uniform cross-linking with a sufficient degree of cross-linking is ensured. The molding tool thus serves both as a heating unit and also simultaneously as a heat distribution structure.

According to a further embodiment of the method, it is proposed that, in step b), the at least one molding tool is positioned so as to be in contact with two adjacent elevations. In this context, the molding tool may be designed in the manner of a U-shaped profile, for example, and consequently to be positioned between two adjacent elevations (and resting on the base surface). In one exemplary configuration, such molding tools to be arranged between all the adjacent elevations of the structural part. Virtually the entire surface of the base surface with the elevations is thereby covered by the molding tools. The molding tools, which are themselves dimensionally stable and are formed with a three-dimensional mold, consequently also serve as holding or supporting elements for the elevations. It is thereby possible to achieve particularly high dimensional tolerances with respect to the position of the elevations in relation to one another and/or of the elevations with respect to the base surface. In addition, it is therefore also possible to introduce heat uniformly over the structural part despite the relatively complex shape of the structural part.

It is also considered to be advantageous that, in step b), the plurality of elevations are fixed by a plurality of interacting molding tools. This means, in particular, that the molding tools interact with one another directly or via the elevations themselves. If appropriate, the molding tools and/or the elevations can therefore also be braced with respect to one another, as a result of which the layers are fixed reliably before and during the polymerization. In particular, this also simplifies the handling or the transportation of the layers prepared for curing.

According to a further embodiment of the method, as step d), the at least one molding tool is removed. In principle, step d) is carried out when step c) has been completed, i.e. the desired degree of crosslinking in the structural part has been at least largely reached. In particular applications, however, it may also be possible for at least some of the molding tools to be removed even when the polymerization is not yet completed. This relates, in particular, to the case when the layers of polymerizable fiber-reinforced composite material are themselves microwave-sensitive.

According to a further aspect of the disclosure also a molding tool for producing a structural part having at least one layer comprising fiber-reinforced composite material is proposed, wherein the molding tool is formed with a three-dimensional mold and the molding tool further has a contact surface for the structural part and at least the contact surface is formed with microwave-sensitive material.

Said molding tool is used, in particular, for carrying out the method described herein according to the disclosure.

In this case, the molding tool is advantageously formed such that, by way of example, a dimensionally stable bearing structure which receives the microwave-sensitive material is provided. Nevertheless, it is also possible, however, that the microwave-sensitive material itself is dimensionally stable and therefore (at least partially) independently forms the three-dimensional mold of the tool. A three-dimensional mold is intended to express, in particular, that what are involved here are not unstable films or the like, but in particular that these are formed so as to have an L-shaped, U-shaped or similar cross section, for example, and do not lose this form even at increased ambient pressure, for example up to 10 bar. The molding tool is generally formed with a contact surface in the region which comprises an outer surface of the molding tool. In one exemplary arrangement, the contact surface is formed with the microwave-sensitive material only on an outer surface, namely that surface which will subsequently be oriented toward the structural part. The microwave-sensitive material is therefore thermally bonded to said contact surface, in order to make it possible to introduce heat into the structural part here.

Moreover, it is considered to be advantageous that the molding tool has a contact surface for the structural part and at least one region outside the contact surface is formed with microwave-transparent material. The molding tool is usually treated with microwaves on the outer surface which lies opposite the contact surface. In order to produce heat in the molding tool close to the contact surface as completely as possible and in a targeted manner, and at the same time to satisfy the high demands with respect to the dimensional stability of the molding tool, it may be expedient to separate the two functions from one another also with reference to the material. Here, the dimensional stability is therefore provided, for example, by a microwave-transparent material, i.e. a material which "lets through" the microwaves, and a virtually complete introduction of energy into the microwave-sensitive material is nevertheless thereby made possible. Examples of such microwave-transparent materials are silicone, PTFE, PP, EP, PET, glass ceramic, aluminum oxide, quartz glass or the like.

In addition, it is proposed that the molding tool has a contact surface for the structural part and an outer surface situated opposite the contact surface, and thermal insulation are provided close to the outer surface. Here, it is also assumed, in particular, that the thermal insulation may comprise microwave-transparent material. The thermal insulation has the effect that the heat produced in the microwave-sensitive material is emitted predominantly only toward the structural part and not to the surrounding area. The efficiency can thereby be increased further. For thermal insulation, use may be made, for example, of glass wool or a similar mineral wool.

According to a further embodiment of the molding tool, said molding tool is formed with at least one cavity. By way of example, the cavity may be designed such that ambient air can flow through it and/or fill it. In particular, said cavity may therefore also be used for thermal insulation. If appropriate, it is also possible for a multiplicity of such cavities to be provided, in which case the cavity can then also be used as a reservoir for various materials (microwave-transparent and/or microwave-sensitive).

In addition, it is also proposed that the molding tool can be connected at least partially to an active cooling system. The active cooling system, similarly to the thermal insulation, should be arranged on that side of the molding tool which is remote from the contact surface, as a result of which furthermore the discharge of heat toward the surrounding area can be prevented in a targeted manner and, if appropriate, only in certain regions. Such an "active" cooling system relates, in particular, to controllable cooling systems, where cooling media flow through the molding tool. Cooling media are, in particular, cold ambient air, a cold gas and/or a cold liquid at a temperature below 40° C. or even below 0° C.

In addition, it is also considered to be advantageous that the molding tool is formed with at least one exposed microwave introduction structure, which interacts with the contact surface made of microwave-sensitive material. This means, in particular, that microwave-sensitive material in heat-conducting contact with the contact surface is arranged in regions remote from the contact surface. In particular, it is therefore also possible to achieve "internal" conduction of heat from positions on the molding tool which are particularly easily reachable for the microwave rays toward the contact surface.

With very particular preference, the method proposed here or the molding tool proposed here is used for producing a component of a fuselage and/or of an outer flow surface of an airplane comprising such a structural part. The component concerns, in particular, a component from the following group: landing flaps, flap track beam, nose parts, rudder unit, elevator unit, spoiler, roof elements, nozzle housing, side min, structural frame. The disclosure can equally be employed for structural parts of other aircraft, e.g. helicopters.

BRIEF DESCRIPTION OF THE DRAWINGS

The disclosure and also the technical context are explained in more detail below with reference to the figures. It should be noted that the figures show exemplary embodiment variants of the disclosure, although the disclosure is not restricted thereto. It is schematically shown in.

DETAILED DESCRIPTION

Figure 1:
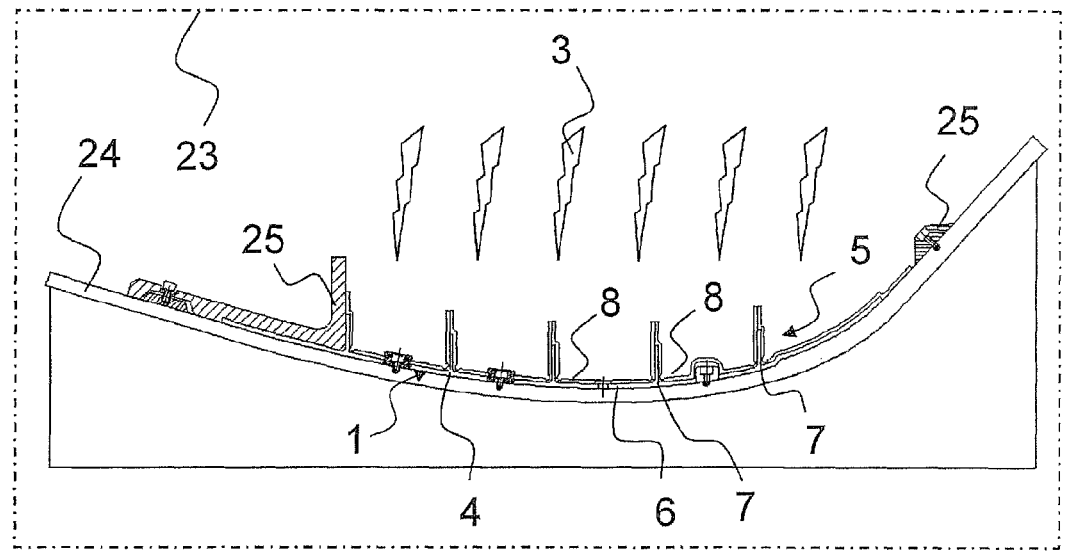
FIG. 1: an apparatus for carrying out the method.

FIG. 1 shows an apparatus 23 for carrying out the method described here according to the disclosure. By way of example, the apparatus may be a microwave autoclave as described in the introduction. A support 24 is provided in said apparatus, and the structural part 1 to be cured, in this case part of a landing flap, is shown thereon in section. The structural part 1 is fixed on the support 24 between two supporting surfaces 25 and has a substantially curved base surface 6 and a plurality of upwardly directed, fin-like elevations 7.

For the local production of a heat source and in order to ensure precise orientation of the elevations 7 in relation to one another, in this case a plurality of molding tools 8 are positioned on that side of the structural part 1 which is opposite to the support 24. Here, the molding tools 8 interact with one another. They are therefore braced in particular to one another and between the two supporting surfaces 25. The molding tools 8 therefore cover the entire free outer surface of the structural part 1 made of polymerizable fiber-reinforced composite material 4.

In order to ensure uniform polymerization despite this relatively complex shape 5 of the structural part, the molding tools comprise microwave-sensitive material which is heated owing to the irradiation with microwaves 3 within the apparatus 23 locally on the structural part 1. In particular, it is therefore possible to achieve temperatures at the structural part which reliably reach at least 130° C. or even 180° C.

Figure 2:
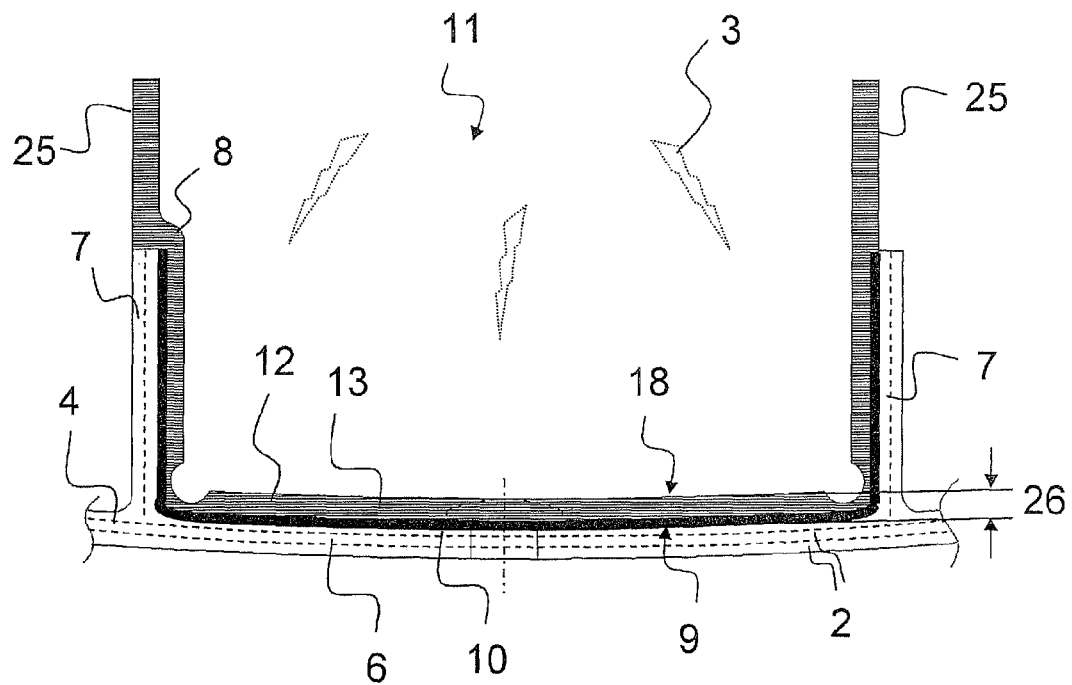
FIG. 2: a first embodiment variant of a molding tool.

FIG. 2 shows a detail of an embodiment variant of the molding tool 8. The bottom of the figure initially shows part of the structural part, which is formed with a plurality of layers 2 made of polymerizable fiber-reinforced composite material (a plurality of plies of a pre-preg material). A shape 5 is present here where two elevations 7 which extend substantially perpendicular to the base surface 6 are provided.

A molding tool 8, which in one exemplary arrangement has a substantially U-shaped design, is positioned between said two elevations 7. Said molding tool completely covers the outer surface of the structural part between said two adjacent elevations 7 and accordingly forms a contact surface 9 with both elevations 7 and the base surface 6 lying therebetween. Precisely this contact surface 9 of the molding tool 8 is formed with the microwave-sensitive material 10. The microwave-sensitive material 10 in this case does not extend over the entire thickness 26 of the molding tool 8; instead, microwave-transparent material 13 is provided only in the outer region 12 toward the outer surface 18 and, by way of example, ensures the three-dimensional, U-like mold 11 even in the case of repeated use of the molding tool 8. Consequently, the microwaves 3 initially penetrate the region 12 with microwave-transparent material 13 and then bring about dielectric heating of the microwave-sensitive material 10 in the region of the contact surface 9.

It can also be seen in FIG. 2 that the lateral wall portions of the U-like mold 11 of the molding tool 8 protrude above the elevations 7. These protruding wall portions likewise serve, in particular, as a supporting surface 25 for adjacent molding tools 8, such that the molding tools 8 are oriented or braced with respect to one another and therefore the position of the elevations can be preserved exactly.

Figure 3:
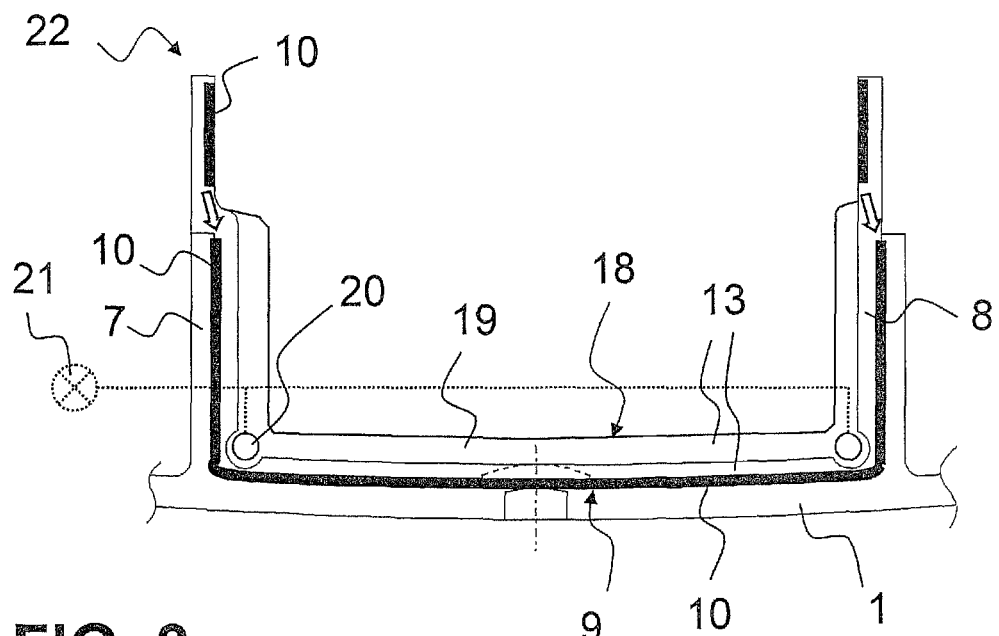
FIG. 3: a second embodiment variant of the molding tool.

FIG. 3 shows a further embodiment variant of a molding tool 8. In this exemplary arrangement, the molding tool 8 is formed with microwave-sensitive material 10 not only in the region of the contact surface 9 but also in the wall portions protruding beyond the elevations 7. By way of example, said portion serves as an exposed microwave introduction structure, from which a flow of heat (indicated by an arrow here) toward the contact surface 9 can be produced. In particular, this also prevents undesirable cold points from being formed in edge regions of the contact surface 9.

In addition, in this case the molding tool 8 is formed with a plurality of regions made of microwave-transparent material 13, wherein thermal insulation 19 (e.g. made of glass wool) is provided here in the region of the outer surface 18. Cavities 20 are additionally formed in the corner regions and can be coupled, by way of example, to an active cooling system 21. It is therefore possible, by way of example, to conduct cool ambient air through the cavities 20.

Figure 4:
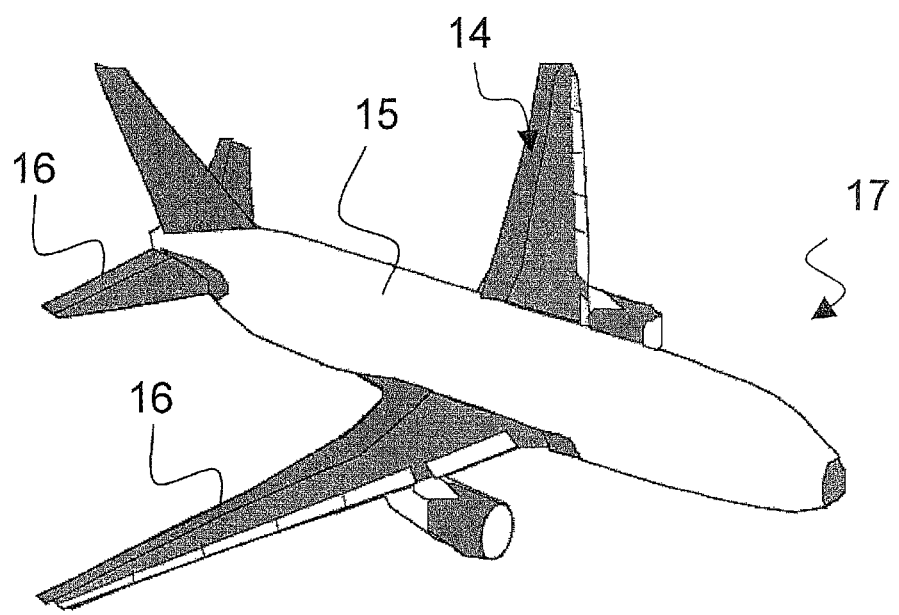
FIG. 4: an airplane.

FIG. 4 also shows the components 14 of the fuselage or of a flow surface 16 of an airplane 17, which can be produced using structural parts by the method described here according to the disclosure. It can be seen that even primary structural parts of the structure of an airplane 17 which have a large surface area can be produced by the proposed method, it equally being possible to reduce the weight of the airplane 17 considerably. The lower consumption of fuel and/or the higher payload associated therewith are essential advantages of this application of the disclosure.

The invention claimed is:

1. A method for producing a structural part having at least one layer comprising fiber-reinforced composite material, said method comprising at least the following steps:
    a) Arranging the at least one layer made of polymerizable fiber-reinforced composite material in a shape, wherein the shape has a base surface and a plurality of elevations, wherein the at least one layer is one of the following:
    a plurality of layers positioned on top of one another in which fibers are arranged in the form of long fibers which are endless in an initial state and are arranged in the structural part in layers with differing orientations of the longitudinal direction of the fibers, and
    a layer of pre-impregnated material;
    b) Positioning at least one molding tool so as to be in contact with at least one elevation such that the at least one molding tool holds and supports the at least one elevation, wherein the molding tool is formed with a microwave-sensitive material at least in one contact surface toward the at least one elevation;
    c) Polymerizing the at least one elevation by irradiating the at least one molding tool with microwaves;
    wherein the molding tool comprises a microwave transparent portion coated by a microwave-sensitive layer on the at least one contact surface facing the material to be molded further wherein, in the polymerizing step, microwaves initially penetrate said microwave-transparent portion and bring about heating of the microwave-sensitive material in a region of the at least one contact surface.

2. The method as claimed in claim 1, in which, in step b), the at least one molding tool is positioned so as to be in contact with two adjacent elevations.

3. The method as claimed in claim 1, in which, in step b), the plurality of elevations are fixed by a plurality of interacting molding tools.

4. The method as claimed in claim 1, in which, as step d), the at least one molding tool is removed.

5. The method as claimed in claim 1, wherein the at least one molding tool has an outer surface situated opposite the contact surface and thermal insulation is provided adjacent to the outer surface.

6. The method as claimed in claim 1, wherein the at least one molding tool has at least one cavity connected at least partially to an active cooling system and the method comprises the step of cooling the at least one molding tool using the active cooling system by conducting ambient air through the at least one cavity.

7. The method as claimed in claim 1, wherein the at least one molding tool is formed with at least one exposed microwave introduction structure and wherein, during the step of polymerizing the at least one elevation by irradiating the at least one molding tool with microwaves, the at least one exposed microwave introduction structure interacts with the contact surface made of microwave-sensitive material to transfer a flow of heat to the contact surface.

8. The method as claimed in claim 1, wherein the at least one layer is a pre-impregnated material that is a fiber form soaked in synthetic resins and thermally treated until the resins have solidified slightly such that the pre-impregnated material is handleable in layers for arrangement during formation of the structural part.

9. A method as claimed in claim 1, wherein thermal insulation is provided on an outer surface of the molding tool that is opposite from a contact surface of the molding tool that contacts the structural part.

10. A method as claimed in claim 1, wherein the molding tool is U-shaped.

11. A method as claimed in claim 10, wherein the molding tool contacts two adjacent elevations.

12. A method as claimed in claim 1, wherein the structural part is produced in an apparatus that comprises the at least one molding tool and a support on which said base surface of said shape of said at least one layer is fixed, wherein said at least one molding tool is positioned on a side of said structural part that is opposite said support.

13. A method as claimed in claim 1, wherein said at least one molding tool at least partially prevents the microwaves from acting directly on the at least one layer.

* * * * *